United States Patent
Marinescu et al.

(10) Patent No.: US 12,412,122 B2
(45) Date of Patent: Sep. 9, 2025

(54) AUTOML WITH MULTIPLE OBJECTIVES AND TRADEOFFS THEREOF

(71) Applicant: International Business Machines Corporation, Armonk, NY (US)

(72) Inventors: Radu Marinescu, Dublin (IE); Parikshit Ram, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 17/489,781

(22) Filed: Sep. 30, 2021

(65) Prior Publication Data

US 2023/0098282 A1 Mar. 30, 2023

(51) Int. Cl.
G06N 20/00 (2019.01)

(52) U.S. Cl.
CPC .................... *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 7,921,371 B1 * | 4/2011 | Roubtsov | G06F 30/15 715/764 |
| 9,104,963 B2 * | 8/2015 | Amid | G06N 3/02 |
| 9,482,442 B1 * | 11/2016 | Mengle | F24F 11/30 |
| 9,953,281 B2 | 4/2018 | Wiig | |
| 10,268,974 B2 | 4/2019 | Wiig | |
| 10,275,418 B2 | 4/2019 | Aleskerov | |
| 10,452,992 B2 * | 10/2019 | Lee | G06N 20/00 |
| 11,003,825 B1 * | 5/2021 | Khatun | G06F 30/30 |
| 2010/0268511 A1 * | 10/2010 | Kato | G06F 11/3452 702/182 |
| 2012/0109606 A1 * | 5/2012 | Dotan | G06F 30/00 703/6 |
| 2014/0089234 A1 * | 3/2014 | Cacioppi | G06F 17/11 706/12 |
| 2016/0110657 A1 | 4/2016 | Gibiansky | |
| 2016/0132787 A1 * | 5/2016 | Drevo | G06N 20/10 706/12 |
| 2016/0358099 A1 * | 12/2016 | Sturlaugson | G06N 5/043 |
| 2017/0061319 A1 * | 3/2017 | Mazzoldi | G06N 3/126 |
| 2018/0018587 A1 * | 1/2018 | Kobayashi | G06N 20/00 |
| 2018/0082212 A1 * | 3/2018 | Faivishevsky | G06N 5/01 |
| 2020/0074348 A1 * | 3/2020 | Chelian | G06N 20/20 |
| 2020/0117765 A1 * | 4/2020 | Sengupta | G06F 30/20 |

(Continued)

FOREIGN PATENT DOCUMENTS

WO    WO-2021216104 A1 * 10/2021  .......... G06F 16/2365

OTHER PUBLICATIONS

WO-2021216104-A1 Barenholz, Tzvika, Automated Generation of Explainable Machine Learning, priority Apr. 22, 2020, 45 pages. (Year: 2020).*

(Continued)

*Primary Examiner* — Barbara M Level
(74) *Attorney, Agent, or Firm* — Gavin Giraud

(57) ABSTRACT

A plurality of objectives is received for a given dataset for an automated machine learning (autoML) process. A set of tradeoffs for the plurality of objectives are received that distribute weights to respective objectives. Pipelines are provided for the dataset that optimize each of the plurality of objectives according to the set of tradeoffs.

18 Claims, 3 Drawing Sheets

(56) References Cited

U.S. PATENT DOCUMENTS

| | | | | |
|---|---|---|---|---|
| 2020/0143243 | A1* | 5/2020 | Liang | G06N 3/045 |
| 2020/0302342 | A1* | 9/2020 | Cheng | G06N 7/01 |
| 2021/0034924 | A1* | 2/2021 | McCourt | G06N 20/00 |
| 2021/0097444 | A1* | 4/2021 | Bansal | G06F 9/5066 |
| 2021/0390376 | A1* | 12/2021 | Byrne | G06N 3/045 |
| 2022/0012542 | A1* | 1/2022 | Cruz | G06N 20/00 |
| 2022/0398460 | A1* | 12/2022 | Dalli | G06F 18/2163 |

OTHER PUBLICATIONS

Das et al., CACTUS: Detecting and Resolving Conflicts in Objective Functions, 13 pages, arXiv:2103.07805v1 [cs.LG] Mar. 13, 2021 (Year: 2021).*

Anonymous, "Debugging Large-Scale Data Pipelines With Consistent Hashing," IP.com, Disclosure No. IPCOM000254870D, Aug. 9, 2018, 6 pages. <https://ip.com/IPCOM/000254870>.

Anonymous, "Pipeline Stage Verification," IP.com, Disclosure No. IPCOM000257343D, Feb. 1, 2019, 3 pages. <https://ip.com/IPCOM/000257343>.

Anonymous, "System and Method for Estimating Gradients with Multiple Computing Nodes," IP.com, Disclosure No. IPCOM000264850D, Jan. 31, 2021, 4 pages. <https://ip.com/IPCOM/000264850>.

Clark et al., "Deep Learning Hyperparameter Optimization with Competing Objectives," SigOpt, 2018, 43 pages.

De Sa et al., "Recipe: A Grammar-based Framework for Automatically Evolving Classication Pipelines," 20th European Conference on Genetic Programming (EuroGP'17), vol. 10196, Mar. 2017, 16 pages. <https://www.researchgate.net/publication/315065572_RECIPE_A_Grammar-Based_Framework_for_Automatically_Evolving_Classification_Pipelines>.

Feurer et al., "Efficient and Robust Automated Machine Learning," Proceedings of the 28th International Conference on Neural Information Processing Systems, vol. 2, Dec. 2015, 9 pages.

Kapoor et al., "Performance and Preferences: Interactive Refinement of Machine Learning Procedures," Association for the Advancement of Artificial Intelligence, 2012, 7 pages.

Kishimoto et al., "Automated Generation of a Machine Learning Pipeline," U.S. Appl. No. 16/851,775, filed Apr. 17, 2020.

Kotthoff et al., "Auto-WEKA 2.0: Automatic model selection and hyperparameter optimization in WEKA," Journal of Machine Learning Research 17 (2016), Nov. 2016, 5 pages. ,https://www.cs.ubc.ca/labs/beta/Projects/autoweka/papers/16-599.pdf>.

Marinescu et al., "Multi-objective Constraint Optimization with Tradeoffs," Conference: constraint programming, vol. 8124, Sep. 2013, 17 pages.

Olson et al., "Automating biomedical data science through tree-based pipeline optimization," arXiv:1601.07925v1 [cs.LG], Jan. 28, 2016, 16 pages. <https://arxiv.org/abs/1601.07925>.

Pfisterer et al., "Multi-Objective Automatic Machine Learning with AutoxgboostMC," arXiv:1908.10796v1 [stat.ML], Aug. 28, 2019, 15 pages.

* cited by examiner

AUTOML WITH MULTIPLE OBJECTIVES AND TRADEOFFS THEREOF

BACKGROUND

Given the growing utility of machine learning (ML) models, there has been an ongoing push to automate the process of generating these models. For example, ML models are often generated with the use of machine learning pipelines. ML pipelines include groups of sequential steps that automate the ML workflow via transforming data. ML pipelines can do nearly everything "behind the scenes" in getting a ML model ready for use. For example, ML pipelines can assist with data extraction, preprocessing, model training, model deployment, and the like. ML pipelines are often built to be small and granular so that they can be independent, reusable, and/or modular, such that pipelines may be swapped out or independently updated when different results are desired.

SUMMARY

Aspects of the present disclosure relate to a method, system, and computer program product relating to generating machine learning pipelines to optimize multiple objectives for a dataset and balance tradeoffs therebetween. For example, the method includes receiving a plurality of objectives for a given dataset for an automated machine learning (autoML) process. The method also includes receiving a set of tradeoffs for the plurality of objectives that distribute weights to respective objectives. The method also includes providing pipelines for the autoML process for the dataset that optimizes each of the plurality of objectives according to the set of tradeoffs. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
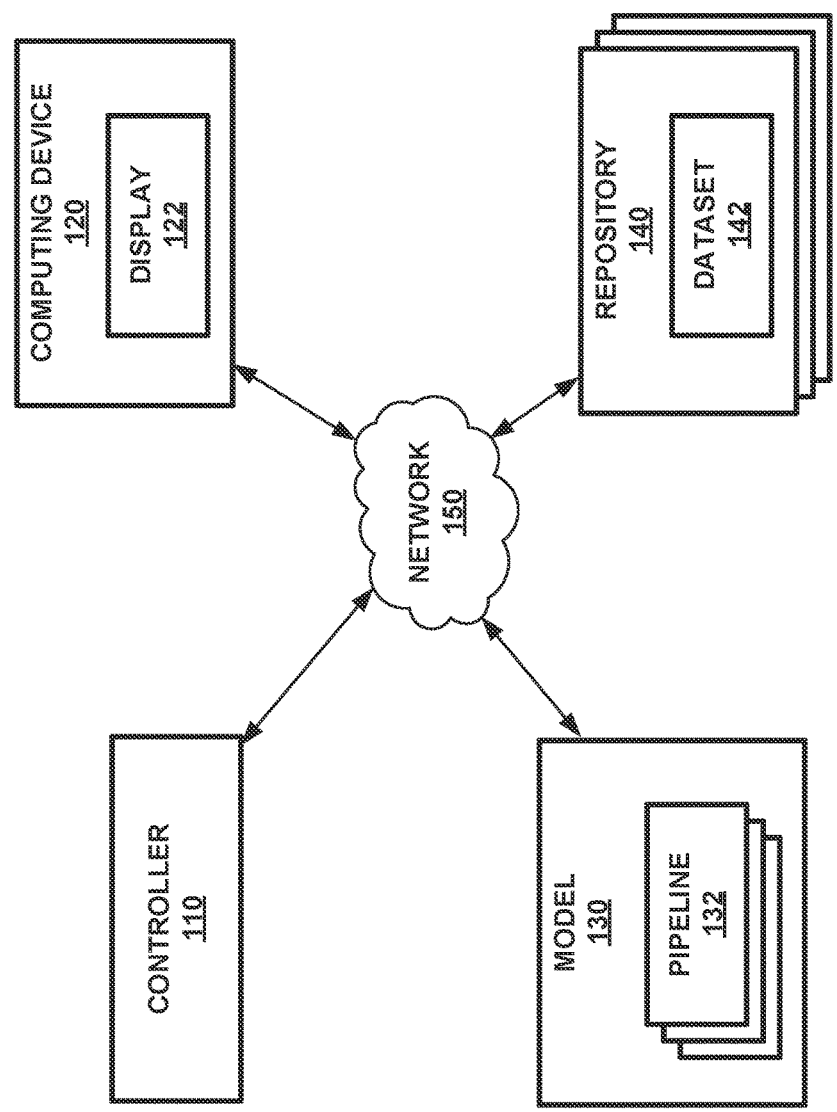
FIG. 1 depicts a conceptual diagram of an example system in which a controller may generate machine learning pipelines that optimize a plurality of objectives according to a plurality of tradeoffs.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing machine learning (ML) pipelines, while more particular aspects of the present disclosure relate to generating pipelines for an automated ML (autoML) process that optimize each of a plurality of objectives according to a set of tradeoffs between the objectives. While the present disclosure is not necessarily limited to such applications, various aspects of the disclosure may be appreciated through a discussion of various examples using this context.

ML models are increasing dramatically in usage and utility. Historically, ML models were created as one (or otherwise few) script(s) that executed each step of ML model usage, from extracting data, to cleaning the data, to prepping the data, to modeling the data, and then finally to deploying the model. It required a highly trained data scientist to create such a script, where this highly trained data scientist would often write certain operations to prioritize what the data scientist would know to be important objectives for this model, including interplay between these objectives. As used herein, an objective refers to an overarching goal under which the dataset is to be processed, where example objectives include accuracy (e.g., an accuracy of classifications), recall, $F_1$, precision, inference time, or the like. However, while generating a single script that covers everything from the initialization of data to the deployment of a model has been shown to be successful once completed, it is also extraordinarily time-consuming, in addition to being extremely error-prone and requiring a very high level of competency across multiple domains (e.g., a high competency in coding, ML, within the technical domain that the model is to be deployed into, etc.).

As discussed in the background, there are increasing efforts to streamline and automate these steps of generating and optimizing ML models. One large effort relates to the usage of individual pipelines that handle discrete steps of generating and deploying ML models and complete them independently within a single pipeline. In this way, rather than using a single script as described above, these steps may be executed by one or multiple pipelines. These discrete pipelines typically each include a plurality of actions, and may be discretely updated/exchanged without impacting adjacent pipelines. While using such pipelines often improves the ability to generate models (e.g., as using pipelines enables a data scientist to improve/update single pipelines for one area without being concerned about other pipelines, and also enable a data scientist to borrow existing well-honed pipelines rather than having to recreate each portion from scratch) and it may improve an ability to quickly update a model (e.g., via the modular nature of pipelines), it may still nonetheless require a skilled data scientist to construct pipelines that serve their needs and optimize all required objectives according to known tradeoffs.

To address this, many conventional system utilize autoML, which utilizes a high degree of automation in generating pipelines as discussed above. AutoML may enable an effective layperson to generate pipelines that do everything from data extraction to model deployment. These conventional autoML solutions enable relatively simple and quick ways to generate a ML model without requiring the significant domain-specific knowledge that is required of traditional ML model development. However, by virtue of conventional autoML simplifying the process to this extent, resultant models made by conventional autoML processes may be relatively unoptimized. For example, while many conventional autoML processes are configured to only focus on a single primary "objective" according to which the dataset is classified, such that this single objective dominates the logic of the pipelines of this model.

There have been some conventional efforts that look to solve this by enabling a user to specify more than one objective that a conventional autoML process may use to evaluate each of these objectives. For example, there are conventional efforts that enable a user to specify that they want the autoML process to, e.g., value both precision and time inference as equal factors in a final deployed model as. However, as would be understood by those of ordinary skill in the art, while there are often numerous objectives that are important to a model, it is relatively rare that all objectives are equally important. Rather, there are typically interrelations between various objectives, where a first objective is vital to the success of the model, a second objective will contribute to the utility of the model, and a third objective would generally be helpful if it could be mostly optimized. Conventional autoML processes fail to consider that some objectives may be more important than others, such that conventional autoML processes are technically incapable of factoring for such tradeoffs between objectives.

Accordingly, aspects of this disclosure may solve or otherwise address these technical problems of conventional computing systems. For example, aspects of this disclosure are related to generating ML pipelines that simultaneously factor multiple objectives that optimize user-specified tradeoffs therebetween. A computing device that includes a processing unit executing instructions stored on a memory may provide this functionality, this computing device referred to herein as a controller. The controller may elicit these tradeoffs from a user in an interactive manner and generate a set of pipelines that optimize these tradeoffs. For example, the controller may receive a set of tradeoffs that specific "trading" 1 unit of accuracy for 2 units of recall, in response to which the controller generates pipelines that reflect these tradeoffs and present the model accordingly. Once presented to the user, the controller may request feedback from the user and receive one or more updates to these tradeoffs (e.g., where the user updated the tradeoffs to be 1.5 units of accuracy for 2 units of recall), in response to which the controller may update/change the pipelines and present the updated model, etc.

Though this disclosure discusses "optimizing" tradeoffs and objectives, it is to be understood that this does not necessarily relate to achieving an "optimal" (i.e., perfect, or best, or as good as could theoretically be achieved) result. Rather, as would be understood by one of ordinary skill in the art, optimizing objectives by optimizing tradeoffs relates to the act of changing various values, rules, pipelines, thresholds, or the like in an interrelated manner in order to generally improve the likelihood that the output/results will be satisfactory to a user that set these objectives and/or tradeoffs.

For example, FIG. 1 depicts environment 100 in which controller 110 extends automated machine learning to optimize multiple objectives with imprecise tradeoffs. Controller 110 may include a computing device, such as computing system 200 of FIG. 2 that includes a processor communicatively coupled to a memory that includes instructions that, when executed by the processor, causes controller 110 to execute one or more operations described below. Computing devices 120 may also include a computing system similar to computing system 200 of FIG. 2, such as a laptop, desktop, tablet, or the like. Controller 110 generates ML model 130 that includes a plurality of pipelines 132 using instructions from a user using computing device 120.

Controller 110 may gather dataset 142 for model 130 and/or components for model 130 (e.g., such as ML modules for/of pipeline 132) from one or more repositories 140. In some examples, controller 110 is a separate external device on network 150 as depicted in FIG. 1. For example, controller 110 may manage the generation of model 130 that optimizes objectives and tradeoffs received from computing device 120 for dataset 142 received from repository 140, and controller 110 may do so from a device that is not physically integrated into whichever computing system hosts model 130 and/or repository 140. In other examples (not depicted), controller 110 (and/or an instance of controller 110) may be integrated into a plurality of computing devices 120 as used by users during model 130 generation process, or controller 110 may be integrated into a server or the like that is hosting one or both of model 130 or repository 140.

Network 150 may include one or more computer communication networks. An example network 150 can include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., controller 110, computing device 120, or a computing device that hosts model 130 and/or repository 140) may receive messages and/or instructions from and/or through network 150 and forward the messages and/or instructions for storage or execution or the like to a respective memory or processor of the respective computing/processing device. Though network 150 is depicted as a single entity in FIG. 1 for purposes of illustration, in other examples network 150 may include a plurality of private and/or public networks over which controller 110 may enable the users to generate model 130 via autoML that optimizes objectives according to tradeoffs as described herein. For example, in some situations network 150 may include a private LAN to which controller 110 and computing devices that host model 130 and repository 140 are connected, where network 150 also include the Internet over which controller 110 interacts with computing device 120.

As discussed, controller 110 receives a plurality of objectives and associated tradeoffs from computing device 120 for a given dataset 142 of repository 140. A user may send this to controller 110 via computing device 120 to create model 130 via an autoML process, in response to which controller 110 may generate model 130 via providing/updating pipelines 132 that optimize these objectives and tradeoffs. As would be understood by one of ordinary skill in the art, objectives are often conflicting, such that it may not be possible for model 130 to be maximized for an objective of precision while also being maximized for an objective of time inference (e.g., as it may take longer to be precise, such that it is functionally impossible for model 130 to be both as quick as possible and also as precise as possible).

Controller 110 may interact with users to help users visualize the "give and take" between these objectives and settle on a final arrangement of tradeoffs. For example, controller 110 may interact with a user regarding these tradeoffs via display 122 on computing device 120. This may include controller 110 providing a user with "neutral" weights assigned to each objective. Controller 110 may enable the user to specify two or more objectives that the user is wanting to modify away from these neutral weights, such that there will be a tradeoff for these two objectives.

Controller 110 may receive an indication that the user has provided a final set of user adjustments for the tradeoffs of these objectives, in response to which controller 110 may identify and/or generate pipelines that optimize these tradeoffs. This may include controller 110 providing model 130 to the user via computing device 120. In some examples, upon seeing or otherwise getting data relating to model 130 and/or completed pipelines 132, the user may want to further want to modify these tradeoffs (e.g., to make model 130 faster, or more precise, or more accurate), such that controller 110 may receive user adjustments until the user is satisfied. In some examples, controller 110 may additionally or alternatively present results of the pipelines according to these tradeoffs. This may include controller 110 providing predicted or calculated metrics on objectives, such as a predicted/calculated accuracy, $F_1$, recall, precision, inference time, or the like. Controller 110 may provide the user an ability to update and modify any objectives or tradeoffs upon presenting the results, in case the user wants to provide an updated set of tradeoffs in response to see the results.

In some examples, controller 110 may be configured to dynamically adjust the tradeoffs as the user is updating them to assist the user in visualizing the optimization possibilities. Controller 110 may dynamically adjust the tradeoffs for some objectives that are inherently interrelated to assist a user in understanding this interrelation. For example, controller 110 may cause display 122 to display fields that relate to how prioritized these objectives are, where controller 110 automatically changes a value on one of these fields in response to receiving a user adjustment to the value on other fields. For another example, the fields may include fillable fields in which a user can provide numbers into these fillable fields that are associated with tradeoffs for respective objectives, where controller 110 may cause a number (e.g., a number between one and ten) to go "higher" in response to a user making another number "lower." Fields may include sliders, where controller 110 causes one slider relating to a "weight" for one objective to move "up" in response to the user moving other another slider relating to a weight for another objective "down" on display 122. For another example, controller 110 could present a slider that can move along a line between two objectives, where the more that the slider is positioned by a user towards one of these two objectives the more that that given objectives is to be prioritized (or deprioritized) relative to the other objective. Though fillable fields and sliders are discussed here for purposes of discussion, any type of field within interactive display 122 over which controller 110 and a user may interact as user changes tradeoff values (and controller 110 provides updates accordingly) is consistent with this disclosure.

In some examples, controller 110 may increase a number of editable tradeoffs over time to simplify the procedure for a user. For example, it may be difficult for a typical user that is using autoML to visualize how tradeoffs between the various objectives will interact, such that it may be overwhelming if not frustrating for a user to know how to set tradeoffs for, e.g., five objectives at a time. As such, controller 110 may initially only enable a user to provide tradeoffs for two or three objectives, after which controller may enable a user to provide tradeoffs for additional objectives (e.g., with the understanding that the previously set tradeoffs will be largely set, and will be only minorly updated with any new tradeoffs). Controller 110 may start this process by having the user identify two (or more) particular objectives that are most important and least important, such that these can be solidified at outer boundaries (e.g., such that a small. Alternatively, controller 110 may start this process by identifying two (or more) objectives that are particularly related, so that the more volatile tradeoffs may be settled before adding in other objectives (e.g., objectives that are relatively less likely to impact tradeoffs to other objectives. Once controller 110 detects that a user has settled on a first set of tradeoffs, controller 110 may add another tradeoff between another pair of objectives. Further, as described below, controller 110 may reduce a set of pipelines 132 as tradeoffs are introduced and the final set of pipelines 132 is honed in.

In some examples there may be tradeoffs between each different pair of objectives, though in other examples only some objectives (and/or some objective pairs) will be associated with tradeoffs. In some examples, a user may specify which objectives are to be associated with tradeoffs. In other examples, controller 110 may prompt a user a user as to which objectives should be associated with tradeoffs (e.g., in response to controller 110 determining that these objectives conflict.

Controller 110 may calculate tradeoffs to determine undominated solutions using various techniques. Below is one example method by which controller 110 may complete a process of producing a plurality of undominated pipelines 132.

Controller 110 may calculate tradeoffs using Pareto-dominance, where tradeoffs are expressed by pairs in a vector format. As discussed herein, a first objective is referred to as "u" and a second objective is referred to as "v." Controller 110 may use Pareto-dominance to determine that there is dominance if and only if (iff) u>v for all values of (forall) of "i," as represented by $u_i > v_i$.

More generally speaking, when u>v, controller 110 may determine that user tradeoffs indicate that u is preferable to v (e.g., as the relevant vector values for u are larger than the vector for v). However, as discussed above, controller 110 may verify whether or not either vector Pareto-dominates the other. For example, if the equation is (3, 12)>(2, 10), controller 110 may identify that (3,12) does Pareto-dominate (2,12), while if the equation is (3, 10)>(2, 12 then controller 110 may identify that (3, 10) does not Pareto-dominate (2, 12). More specifically, if controller 110 receives tradeoffs from a user of {(1,0),(0,1)} controller 110 may detect these tradeoffs to indicate that the user prefers one unit of the first objective to a unit of the second objective. Controller 110 may store these tradeoffs T as $$\{(u_i, v_i) | i=1, \ldots, k\}$$

where "k" is the full number of tradeoffs.

Once controller 110 identifies these two vectors u and v, controller 110 may determine whether or not u dominates v with respect to tradeoffs T. This may include controller 110 verifying whether or not:

$$u >_T v$$

Controller 110 may determine this by checking whether or not u-v is inside the convex cone defined by vectors $(u^i - v^i)$ for all $(u^i, v^i)$ in T. Specifically, controller 110 may verify whether or not there it can identify any scalars $q_i$ such that $$u - v >= q_1(u^1 - v^1) + \ldots + q_k(u^k - v^k)$$

As would be understood by one of ordinary skill in the art, such techniques by controller 110 equate to controller 110 using a linear programming (LP) method to determine if a finite set of linear inequalities is satisfiable.

From this point, controller 110 calculates the undominated vectors. Specifically, given a set of vectors V and a set of tradeoffs, controller 110 determines UNDOMINATED (V) by removing any vector v from V that is dominated with respect to tradeoffs by another vector u that is within V (this is the closure of V under the dominance relation defined above).

Controller 110 may then provide pipelines 132 as discussed herein. While in some cases controller 110 may provide pipelines 132 via utilizing a previously generated pipeline 132 that optimizes the criterion received from computing device 120 (e.g., where this previously generated pipeline 132 is stored in one of repositories 140 of historical pipelines), in other examples controller 110 may generate new pipelines (or update current pipelines) in response to various input. This input may include dataset 142 (which controller 110 may split into two portions, where a first portion is for training and a second portion is for testing), objectives, tradeoffs, and various ML modules. Using this input, controller 110 may provide a set of undominated instantiated pipelines 132 that optimize these tradeoffs.

Controller 110 may attach input ML modules ($M_1$- . . . $M_n$) to a structure of pipelines 132. For purposes of conversation, $X_M$ is a set of variables corresponding to the ML modules (values=ML algorithms), and $X_H$ includes variables corresponding to hyperparameters (values=hyperparameter values). Similarly, for purposes of conversation, let us assume that all variables are discrete, and let pipelines 132 be represented by P={ }.

In this example, controller 110 may execute a depth-first search (e.g., one that is randomized) over the space defined by $X_M$ and $X_H$. Upon controller 110 executing a "complete" instantiation $x_M$ of $X_M$ and the corresponding subset $x_{MH}$ (i.e., hyperparameter variables relevant to current algorithm selection $x_M$), controller 110 may realize an instantiated pipeline 132. Let us refer to this instantiated pipeline 132 as $P_i$. Controller 110 may then train this pipeline 132 $P_i$ on a first training portion of dataset 142, and then determine its utility vector (i.e., objective values $u=(u_1, \ldots, u_k)$) on a testing portion of dataset 142.

At this point, controller 110 may add $P_i$ to P (together with its corresponding utility vector). Controller 110 may further remove any undominated pipelines 132 (e.g., by applying a condition P=UNDOMINATED(P)). In this way controller 110 may remove any undominated pipelines 132 in a manner that accounts for/considers the received tradeoffs.

As discussed above, controller 110 may further elicit tradeoffs in interacting with the user and generating pipelines 132 for model 130. In realizing these tradeoffs, controller 110 may have as inputs the set of pipelines 132 as discussed above, where each may be associated with a utility vector $\underline{u}^i=(u_1, \ldots, u_k)$ with $1<=i<=n$. Controller 110 may be looking to turn this into a set of preferences, where these preferences are represented as ($\underline{u}^i>\underline{u}^j$). For purposes of discussion, let user preferences be represented by U={ }.

As discussed above, the process of finalizing how tradeoffs are realized may be repeated until a user is satisfied. For example, a user may repeatedly provide new tradeoffs or new levels of tradeoffs, in response to which controller 110 may continually update the parameters as discussed herein. This may include an example where controller 110 selects two pipelines $P_i$ and $P_j$ from P such that $P_i$ is preferred to $P_j$. Controller 110 may determine whether or not ($\underline{u}^i>\underline{u}^j$) is in U. If controller 110 determines that ($\underline{u}^i>\underline{u}^j$) is not in U, then controller 110 may add ($\underline{u}^i>\underline{u}^j$) to U. Upon conclusion of this cycle, controller 110 returns U, such that the elicited preferences U are used in controller's 110 subsequent interaction in providing/producing a new and (and presumably smaller) set of undominated pipelines 132.

In this way, controller 110 may produce a plurality of undominated ML pipelines 132 using an input of dataset 142, two or more objectives, a set of imprecise tradeoffs between those objectives, and a set of pre-processors, transformers and estimators. Beyond this, using these techniques controller 110 may interact with the user via computing device 120 to realize additional user-specified tradeoffs between objectives, updating the undominated set of ML pipelines 132 in response to gaining these additional tradeoffs. Further, as discussed above, controller 110 may continue with this iterative process to gradually increase the size of tradeoffs (and correspondingly decrease the set of ML pipelines 132 as dominated pipelines 132 are removed) until the user is satisfied.

As such, aspects of the disclosure may enable the controller 100 to have a layperson replicate what would otherwise require one or more highly trained data scientists by automating the pipeline construction process in a manner that addresses multiple objectives simultaneously while factoring for imprecise tradeoffs therebetween. Further, as would be understood by one of ordinary skill in the art, controller 110 generates these pipelines 132 such that the final set may be significantly smaller than the Pareto-optimal ones and therefore potentially be much more informative and/or useful to the data scientist/user.

Figure 2:
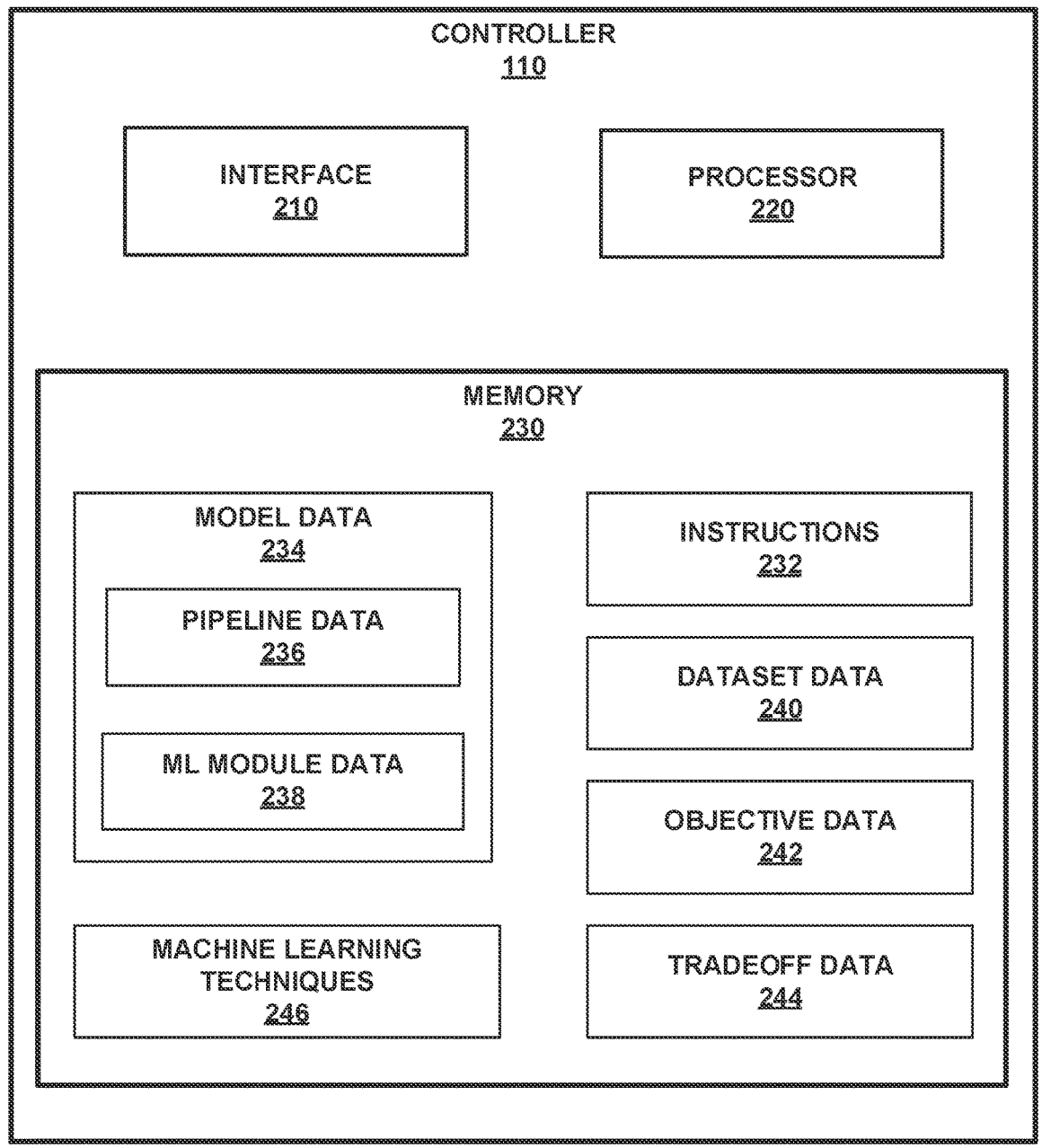
FIG. 2 depicts a conceptual box diagram of example components of the controller of FIG. 1.

As described above, controller 110 may be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with computing devices 120, servers that host model 130 or repository 140, or the like. Interface 210 may include one or more network interface cards, such as Ethernet cards and/or any other types of interface devices that can send and receive information. Various numbers of interfaces may be used to perform the described functions according to particular needs.

As discussed herein, controller 110 may be configured to automate the pipeline construction process when accounting for numerous objectives and tradeoffs therebetween. Controller 110 may utilize processor 220 to thusly automated the pipeline construction process. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to automate the pipeline construction process.

Processor 220 may automate the pipeline construction process according to instructions 232 stored on memory 230 of controller 110. Memory 230 may include a computer-readable storage medium or computer-readable storage device. In some examples, memory 230 includes one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like.

In addition to instructions 232, in some examples gathered or predetermined data or techniques or the like as used by processor 220 to automate the pipeline construction process as described herein is stored within memory 230. For example, memory 230 may include model data 234, which may include the finished model 130. Model data 234 may further include pipeline data 236 (which may include all undominated pipelines 132 provided by controller 110) as well as machine learning module data 238. For example, machine learning module data 238 may include any ML modules received for input, such as a support vector machine (SVM) module, decision tree (DT) modules, multilayer perceptron (MLP) module, or the like.

Memory 230 may also include dataset data 240, which may be all of dataset 142 for which these pipelines 132 were constructed. In some examples, dataset 142 may be stored within dataset data 240 as divided into the training portion and the testing portion. Memory 230 may further include the objective data 242 and the tradeoff data 244 received (and/or elicited) from user as described herein.

Memory 230 may further include machine learning techniques 246 that controller 110 may use to improve a process of automating the pipeline construction process as discussed herein over time. Machine learning techniques 246 can comprise algorithms or models that are generated by performing supervised, unsupervised, or semi-supervised training on a dataset, and subsequently applying the generated algorithm or model to automate the pipeline construction process.

Machine learning techniques 246 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, machine learning techniques 246 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
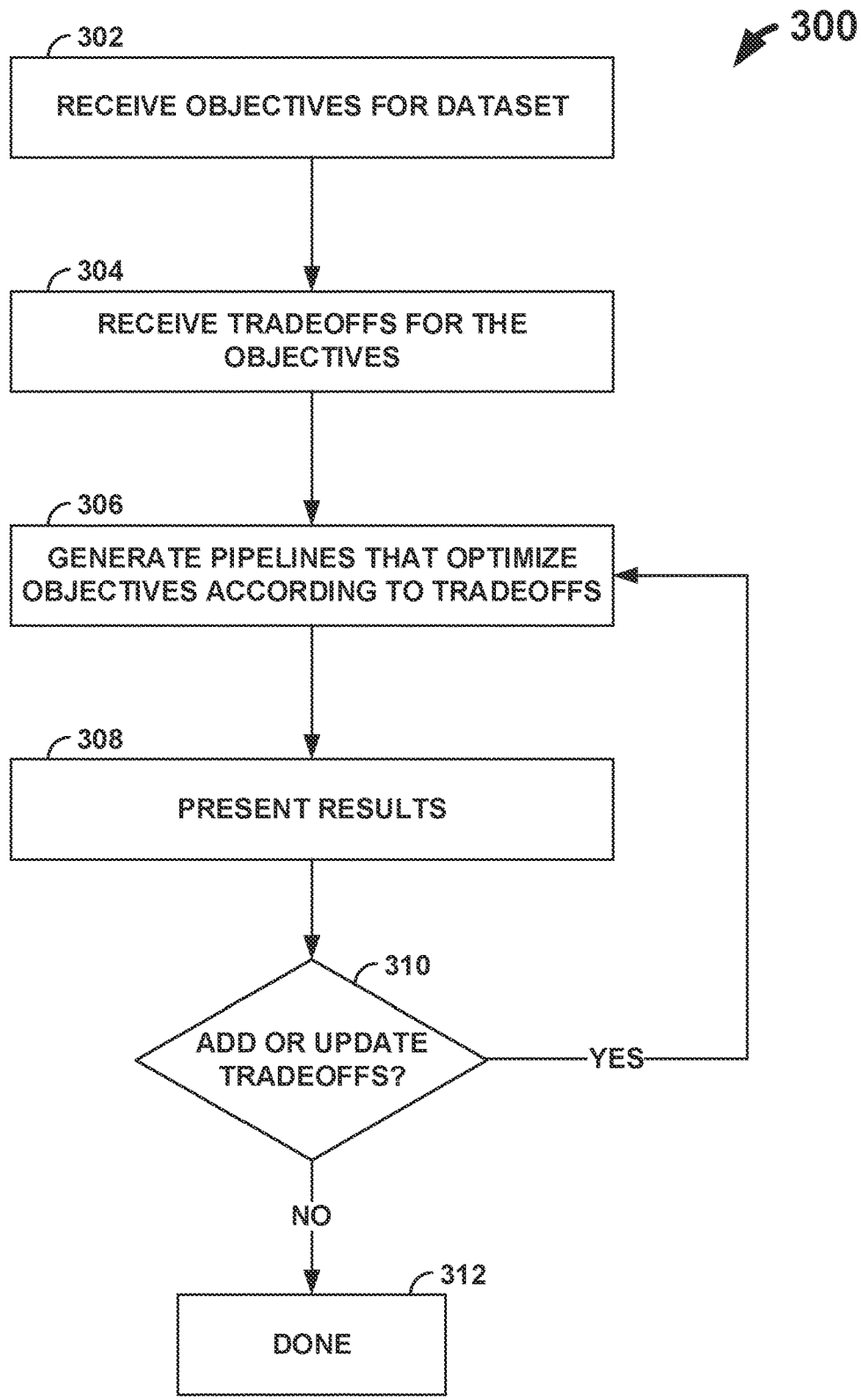
FIG. 3 depicts an example flowchart by which the controller of FIG. 1 may generate machine learning pipelines that optimize a plurality of objectives according to a plurality of tradeoffs.

Using these components, controller 110 may automate the pipeline construction process for a dataset according to a set of objectives and user-defined tradeoffs therebetween as discussed herein. In some examples, controller 110 automates the pipeline construction process according to flowchart 300 depicted in FIG. 3. Flowchart 300 of FIG. 3 is discussed with relation to FIG. 1 for purposes of illustration, though it is to be understood that other systems and message may be used to execute flowchart 300 of FIG. 3 in other examples. Further, in some examples controller 110 executes a different method than flowchart 300 of FIG. 3, or controller 110 executes a similar method with more or less steps in a different order, or the like.

Flowchart 300 starts with controller 110 receiving objectives for dataset 142 (302). Controller 110 receives a plurality of objectives. Controller 110 further receives user-defined tradeoffs between the objectives (304). Controller 110 may generate pipelines 132 that optimize these objectives according to the received tradeoffs (306). For example, controller 110 may generate undominated pipelines 132 as discussed herein.

Controller 110 may further present these results to a user (308). Controller 110 may present these results using display 122 of computing device 120. Controller 110 may present these results in a way designed to elicit further instruction from the user. Upon presenting these results, controller 110 determines whether or not the user has added or updated any tradeoffs (310). Where controller 110 detects additional and/or changed tradeoffs from the user ("yes" branch from 310), controller 100 generates a new/updated set of pipelines 132 that match these tradeoffs as described herein (306). In this way, flowchart 300 includes a loop 306-310 in which controller 110 interacts with a user to iteratively perfect the set of tradeoffs while reducing the set of pipelines 132 (e.g., by eliminating undominated pipelines 132). When the tradeoffs are finalized ("no" branch from 310), flowchart 300 is done (312) and controller 110 may deploy model 130 or otherwise provide model 130 to the user for use.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving a plurality of interrelated objectives for a given dataset for an automated machine learning (autoML) process;
receiving a set of tradeoffs for the plurality of interrelated objectives that distribute weights to respective objectives;
displaying adjustable elements to a user through a display, wherein each adjustable element represents one of the plurality of objectives initialized to neutral weights for each of the plurality of objectives;
receiving a user adjustment to two or more of the adjustable elements away from the neutral weights; and
dynamically adjusting the displaying of the adjustable elements of objectives other than the two or more of the adjustable elements based on the user adjustment and the set of tradeoffs;
providing pipelines for the dataset that optimize each of the plurality of interrelated objectives according to the adjusted weights of the adjustable elements set by the user.

2. The computer-implemented method of claim 1, wherein the pipelines are undominated as a result of generating the pipelines according to the set of tradeoffs includes using Pareto-dominance.

3. The computer-implemented method of claim 1, wherein pipelines include a first number of pipelines and the set of tradeoffs consists of two tradeoffs for two respective objectives, the method further comprising:
presenting, to a user, results of the pipelines that optimize the plurality of objectives according to the two tradeoffs of the set of tradeoffs;
receiving, from the user, a third tradeoff such that an updated set of tradeoffs with the two tradeoffs and the third tradeoff redistributes weights to three respective objectives of the plurality of objectives; and
generating updated pipelines with a second number of pipelines that is less than the first number, wherein the updated pipelines optimize each of the plurality of objectives according to the updated set of tradeoffs.

4. The computer-implemented method of claim 1, further comprising presenting results of the pipelines to a user.

5. The computer-implemented method of claim 4, wherein the set of tradeoffs is a first version of the set of tradeoffs is received from the user, the method further comprising receiving a second version of the set of tradeoffs from the user in response to presenting results of the pipelines to the user.

6. The computer-implemented method of claim 1, wherein the receiving the set of tradeoffs further comprises receiving an indication from the user that the user has provided a final user adjustment, wherein the pipelines are provided in response to receiving the indication.

7. The computer-implemented method of claim 1, wherein the set of tradeoffs is selected from a group consisting of accuracy, recall, precision and $F_1$ score.

8. A system comprising:
a processor; and
a memory in communication with the processor, the memory containing instructions that, when executed by the processor, cause the processor to:
receive a plurality of interrelated objectives for a given dataset for an automated machine learning (autoML) process;
receive a set of tradeoffs for the plurality of interrelated objectives that distribute weights to respective objectives;
display adjustable elements to a user through a display, wherein each adjustable element represents one of the plurality of objectives initialized to neutral weights for each of the plurality of objectives;
receive a user adjustment to two or more of the adjustable elements away from the neutral weights; and
dynamically adjust the displaying of the adjustable elements of objectives other than the two or more of the adjustable elements based on the user adjustment and the set of tradeoffs;
provide pipelines for the dataset that optimizes each of the plurality of interrelated objectives according to the adjusted weights of the adjustable elements set by the user.

9. The system of claim 8, wherein the pipelines are undominated as a result of generating the pipelines according to the set of tradeoffs includes using Pareto-dominance.

10. The system of claim 8, wherein the pipelines include a first number of pipelines and the set of tradeoffs consists of two tradeoffs for two respective objectives, the memory containing additional instructions that, when executed by the processor, cause the processor to:
present, to a user, results of the pipelines that optimize the plurality of objectives according to the two tradeoffs of the set of tradeoffs;
receive, from the user, a third tradeoff such that an updated set of tradeoffs with the two tradeoffs and the third tradeoff redistributes weights to three respective objectives of the plurality of objectives; and
generate updated pipelines with a second number of pipelines that is less than the first number, wherein the updated pipelines optimize each of the plurality of objectives according to the updated set of tradeoffs.

11. The system of claim 8, the memory containing additional instructions that, when executed by the processor, cause the processor to presenting results of the pipelines to a user.

12. The system of claim 11, wherein the set of tradeoffs is a first version of the set of tradeoffs received from the user, the memory containing additional instructions that, when executed by the processor, cause the processor to receive a second version of the set of tradeoffs from the user in response to presenting results of the pipelines to the user.

13. The system of claim 8, the memory containing additional instructions for the receiving the set of tradeoffs that, when executed by the processor, cause the processor to receive an indication from the user that the user has provided a final user adjustment, wherein the pipelines are generated in response to receiving the indication.

14. A computer program product, the computer program product comprising a computer readable storage medium having program instructions embodied therewith, the program instructions executable by a computer to cause the computer to:
receive a plurality of interrelated objectives for a given dataset for an automated machine learning (autoML) process;
receive a set of tradeoffs for the plurality of interrelated objectives that distribute weights to respective objectives;
display adjustable elements to a user through a display, wherein each adjustable element represents one of the plurality of objectives initialized to neutral weights for each of the plurality of objectives;

receive a user adjustment to two or more of the adjustable elements away from the neutral weights; and dynamically adjust the displaying of the adjustable elements of objectives other than the two or more of the adjustable elements based on the user adjustment and the set of tradeoffs;

provide pipelines for the dataset that optimizes each of the plurality of interrelated objectives according to the adjusted weights of the adjustable elements set by the user.

15. The computer program product of claim 14, wherein the pipelines are undominated as a result of generating the pipelines according to the set of tradeoffs includes using Pareto-dominance.

16. The computer program product of claim 14, wherein the pipelines include a first number of pipelines and the set of tradeoffs consists of two tradeoffs for two respective objectives, the computer readable storage medium containing additional program instructions that, when executed by the computer, cause the computer to:

present, to a user, results of the pipelines that optimize the plurality of objectives according to the two tradeoffs of the set of tradeoffs;

receive, from the user, a third tradeoff such that an updated set of tradeoffs with the two tradeoffs and the third tradeoff redistributes weights to three respective objectives of the plurality of objectives; and generate updated pipelines with a second number of pipelines that is less than the first number, wherein the updated pipelines optimize each of the plurality of objectives according to the updated set of tradeoffs.

17. The computer program product of claim 14, the memory containing additional instructions that, when executed by the processor, cause the processor to presenting results of the pipelines to a user.

18. The computer program product of claim 17, wherein the set of tradeoffs is a first version of the set of tradeoffs received from the user, the computer readable storage medium containing additional program instructions that, when executed by the computer, cause the computer to receive a second version of the set of tradeoffs from the user in response to presenting results of the pipelines to the user.

* * * * *